US005655063A

United States Patent [19]
Crocker

[11] Patent Number: 5,655,063
[45] Date of Patent: Aug. 5, 1997

[54] TOPOLOGY BASED TOLERANCING FOR GEOMETRIC MODELING OPERATIONS

[75] Inventor: Gary A. Crocker, San Diego, Calif.

[73] Assignee: Computervision Corporation, Bedford, Mass.

[21] Appl. No.: 266,984

[22] Filed: Jun. 28, 1994

[51] Int. Cl.$^6$ .................................................. G00T 15/00
[52] U.S. Cl. ............................................................. 395/120
[58] Field of Search .............................. 395/118–120, 100

[56] References Cited

PUBLICATIONS

Tsujio, Showzow et al "Computer–Aided Drawing Check for CAD System—A Method for the Checking of Dimensions in Multiview Mechanical Drawings," *Systems Engineering, 1992 IEEE International Conference*, pp. 234–237, (1992).

Valainis, John et al, "Two–Dimensional IC Layout Compaction Based on Topological Design Rule Checking," *IEEE Transactions on Computer–Aided Design of Integrated Circuits*, pp. 260–275, (1990).

Quinlan, Sean, et al, "Elastic Bands: Connecting Path Planning and Control," *Robotics and Automation, 1993 IEEE International Conference*, pp. 802–807, (1993).

Verwer, Ben J. H., "A Multisolution Work Space, Multiresolution Configuration Space Approach to Solve the Path Planning Problem," *Robotics and Automation, 1990 IEEE International Conference*, pp. 2107–2112, (1990).

*Using Tolerances to Guanrantee Valid Polyhedral Modeling Results*, Mark Segal, Computer Graphics, vol. 24, No. 4, Aug. 1990.

*Primary Examiner*—Heather R. Herndon
*Assistant Examiner*—Rudolph Buchel
*Attorney, Agent, or Firm*—Wolf, Greenfield & Sacks, P.C.

[57] ABSTRACT

The invention relates to a method and apparatus for tracking and modifying the accumulated error and the current operational tolerance of each topological entity in a geometric model of a three dimensional object. Each topological entity has assigned to it a Mintol value and a Maxtol value, Mintol represents the current accumulated error associated with the entity. Maxtol represents the operational tolerance of the entity for future operations. The Mintol value for an entity is set and occasionally adjusted so that it comprises a volume which encompasses all other entities adjacent to the particular entity. With respect to Maxtol, when two entities are within a distance from each other which is less than the sum of the Maxtols of the two entities, the two entities can be combined. Maxtol is adjusted whenever Mintol is adjusted so as to remain larger than Mintol and whenever a new entity is created by the combination of old entities, so as to encompass the Maxtols of the two old entities.

36 Claims, 10 Drawing Sheets

TOPOLOGY BASED TOLERANCING FOR GEOMETRIC MODELING OPERATIONS

FIELD OF THE INVENTION

The invention relates to geometric modeling software such as CAE/CAD/CAM. More particularly, the invention relates to a method and apparatus for increasing accuracy and decreasing the failure rate of computer aided geometric modeling operations by assigning each topological entity which has a relationship to a geometric entity two additional tolerance data items.

BACKGROUND OF THE INVENTION

Modeling of objects in three dimensions using information processing systems has many applications. For example, software models are used during the design of mechanical parts since, among other reasons, it is usually much less expensive and time consuming to test a computer generated model of a part for parameters such as correct fit than it is to construct and test an actual prototype part. Another important purpose of modeling is to obtain a visual image of a part under design. Accordingly, there is a wide variety of software packages available on the market for geometric modeling of three dimensional objects. Such software programs are typically termed CAD programs, for computer-aided-design. Depending on the particular application for which a program is designed for use, it may also be referred to as CAE (computer aided engineering), CAM (computer aided manufacturing), CAD/CAM or other type of program.

A geometric modeling software package, such as a CAD software package, is employed by a user to create a model of a three dimensional object which can be displayed in a two dimensional representation on a computer video display terminal. The model comprises a dataset which defines the three dimensional object which is being modeled in terms of a plurality of geometric entities (i.e., shapes) in a linked network which defines how the individual geometric entities are related to each other topologically. The basic geometric entities in modeling software are (1) a point, which is a zero manifold entity, (2) a curve, which is a one manifold entity, and (3) a surface, which is a two manifold entity. A geometric entity is represented in the dataset of a model as an equation which represents the position and shape of the entity. For instance, the information in the dataset associated with a point is its three dimensional coordinates, x,y,z. The information defining a straight line (which is a type of curve) would be the equation for the line in three dimensional space, e.g. $Ax+By+Cz$, where A, B and C are constants. A planar surface is represented by a plane equation. More complex entities, such as splines, NURB curves and irregular surfaces are represented as approximations. Each geometric entity has associated with it a corresponding topological entity. The corresponding topological entit for a point is a vertex. The corresponding topological entity for curve is an edge. The corresponding topological entity for a surface is a face. In the dataset comprising a model each topological entity is a set of data defining the corresponding geometric entity, and indicating the other topological entitie which are adjacent to the particular topological entity. For instance, the data in the dataset associated with corner vertex 12 of cube 10 in FIG. 1 includes the corresponding geometric data (i.e., the x, y, z coordinates of vertex 12), the identity of the three edges 14, 16, and 18 which come into (meet at) the vertex, and the identity of the three surfaces 20, 22 and 24 which are adjacent to the vertex. Thus, the collection of topological entit data forms a network of associated data items which defines the model. The model of the overall cube of FIG. 1 comprises a linked network by virtue of the fact that each of the entities joined to vertex 12 is further joined to other entities. For instance, edge 18, in addition to being joined to vertex 12, is joined to vertex 26, among other entities.

Despite significant advances in geometric modeling software over the past decade, geometric modeling programs generally have a relatively high rate of failure in production environments. Failure generally occurs in two modes. In the first mode, the software itself recognizes an inconsistency in the dataset which it cannot resolve. In such an instance, the modeling software would quit the operation requested by the user and provide the user with an error message indicating that the program cannot proceed further. In the second mode of failure, the system may not recognize an inconsistency in data and will complete an operation resulting in invalid data. In such an instance, the user may or may not recognize on his own that the model comprises invalid data. In fact, the user may not recognize the existence of an invalid design until after considerable expense is incurred, for instance, in preparing a prototype based on the model. Accordingly, it is very desirable to minimize the rate of failure in geometric modeling software systems.

In geometric modeling, the level of accuracy of data varies depending on the type of data and the number and type of operations that have been performed to arrive at the data. For instance, a system may support a certain number of significant digits, e.g., 16 significant digits. Data associated with non-complex entities such as the coordinate position of a point or the equation defining a straight line can be input into the system with the maximum number of significant digits. However, as operations are performed on that data, such as moving the entity or causing it to intersect or join another entity, the accuracy of the resulting data decreases. Further, more complex geometric entities such as complex curves, known as spline curves or NURB curves, and complex surfaces are created and represented by a mathematical equation which is an approximation of the actual desired entity. Thus, all geometric entities are represented by an exact equation. The problem is that the equation itself may result in an entity which is an approximation. Typically, however, the accuracy of the approximation can be determined by calculation. Accordingly, there is a known error associated with such entities. The accuracy of such spline curves or other high order geometric entities typically start out lower than the maximum accuracy of the system. When operations are performed on an entity, its accuracy decreases even further. Operations which typically result in decreased accuracy of the model include movement of an entity and the intersection of two entities.

A fundamental query for a geometric modeler is when two geometric entities can be considered the same entity, e.g., when are two points close enough that they can be considered a single point. The answers to these queries should depend on several factors including the accumulated error of each of the entities, the proximity of each of the entities and the desired accuracy of the model as determined by the user.

There are two primary tolerancing schemes employed in curved surface based modelers of the prior art, namely, fixed absolute tolerancing and fixed relative tolerancing. In a fixed absolute tolerance system, every entity has the same tolerance. For instance, the tolerance may be set at $1.0e^{-4}$ (0.0001) and every entity is assigned that tolerance regardless of its size or position. In a absolute relative tolerance system, every entity is assigned a predetermined number of significant digits, rather than an absolute tolerance.

Accordingly, it is an object of the present invention to provide improved software for geometric modeling.

It is another object of the present invention to provide software for geometric modeling in which each entity may have a different tolerance and in which the system stores data on the tolerances of each entity.

It is a further object of the present invention to provide software for geometric modeling with improved accuracy and a decreased rate of failure.

It is yet another object of the present invention to provide software for geometric modeling which creates a model which is assured to be closed and, therefore, presumably manufacturable.

It is an additional object of the present invention to provide software for geometric modeling which allows for importing data from other systems which may have different internal tolerancing schemes than a system having the present invention.

SUMMARY OF THE INVENTION

The invention is a method and apparatus for geometric modeling of three dimensional objects in which each topological entity in the model which has a relationship to a geometric entity in the model has associated with it two additional pieces of data, termed Mintol and Maxtol. Mintol represents the accumulated error associated with the corresponding topological entity up to the present point in time. Maxtol represents the operational tolerance of the corresponding topological entity which is used for future operations involving the entity. Thus, both Mintol and Maxtol define a volume around each topological entity. In particular, with respect to a vertex, Mintol and Maxtol define spherical volumes. With respect to an edge, Mintol and Maxtol define tubular (or cylindrical) volumes centered around the edge. Finally, with respect to a face, Mintol and Maxtol define slab-like volumes surrounding the face.

For topological entities which relate to simple geometric entities, such as a point or a line or a simple curve which can be defined precisely by coordinates and/or a mathematical equation, the Mintol originally assigned thereto typically will be zero since no error has accumulated in the creation of the entity. However, as operations concerning that entity are performed, a non-zero Mintol may be assigned to the entity. The Mintol of a topological entity resulting from the joining of two entities is the minimum distance from the entity which encompasses the Mintols of the portions of all of the two joined entities. For instance, the Mintol of a vertex is the maximum distance from the point of the vertex to the end points of all of the curves belonging to edges which are joined to the vertex.

Maxtol is a distance which is greater than Mintol and, in the preferred embodiment, is at least two times Mintol. However, the relationship of Maxtol to Mintol can be altered as a result of data operations. Maxtol is used for the basic geometric queries relating to determining if two entities are close enough to be joined. For instance, are two vertices close enough to each other to be combined into a single vertex or is a vertex close enough to an edge to be considered to lie on the edge. Two entities are to be joined (either merged into a single entity or intersected as the case may be) when they are within a distance from each other which is less than the sum of the Maxtols of the two entities. The Maxtol of a topological entity resulting from the joining of two entities is the minimum distance from the entity which encompasses the Maxtols of the portions of the two topological entities which were joined. The Maxtol of an entity also is modified every time the Mintol of the entity is modified. In the preferred embodiment, Maxtol is maintained at no less than two times the Mintol of the associated entity. In the preferred embodiment, when two entities are joined, the new entity which is created thereby is assigned a geometric equation which defines the average of the joined portions of the entities from which it was created.

To achieve a reliable set of topological/geometric operations, Mintol and Maxtol must be defined with respect to each other in such a way that inconsistencies are not produced. The following rules comprise a preferred method of governing the behavior of the Mintol and Maxtol values to avoid inconsistencies:

1. the Maxtol of an entity must be greater than the Mintol of that entity, and preferably, two times Mintol;
2. the Maxtol of a vertex must be greater than or equal to the Maxtol of adjacent edges and must completely enclose the ends of the Maxtol "tube" of the edges;
3. the Maxtol of an edge must be greater than or equal to the Maxtol of the adjacent faces and must completely enclose the sides of the Maxtol "slab" of the face;
4. a topological entity which is completely within the combined Maxtols of another entity of the same type must be merged with that entity;
5. the entity resulting from the joining of two entities must have a Mintol volume which encloses the Mintol volumes of the joined portions of both of the parent entities; and
6. the entity resulting from the joining of two entities must have a Maxtol volume which encloses the Maxtol volumes of the joined portions of both the parent entities.

DETAILED DESCRIPTION OF THE INVENTION

In the present invention, every topological entity which has a relationship to a geometric entity has two additional pieces of data related thereto in the dataset. The two pieces of data are referred to herein as Mintol and Maxtol. Mintol represents the current accumulated error associated with the corresponding entity. Maxtol represents the operational tolerance of the corresponding entity which will be used for further operations relating to the entity and, in particular, whether two entities are close enough to each other that they should be joined. Mintol and Maxtol each are distances. In particular, each defines a distance from the topological entity. In effect, Mintol and Maxtol each define a three dimensional volume centered around the topological entity, the volume being all space which is within the defined distance of the topological entity.

Figure 1:
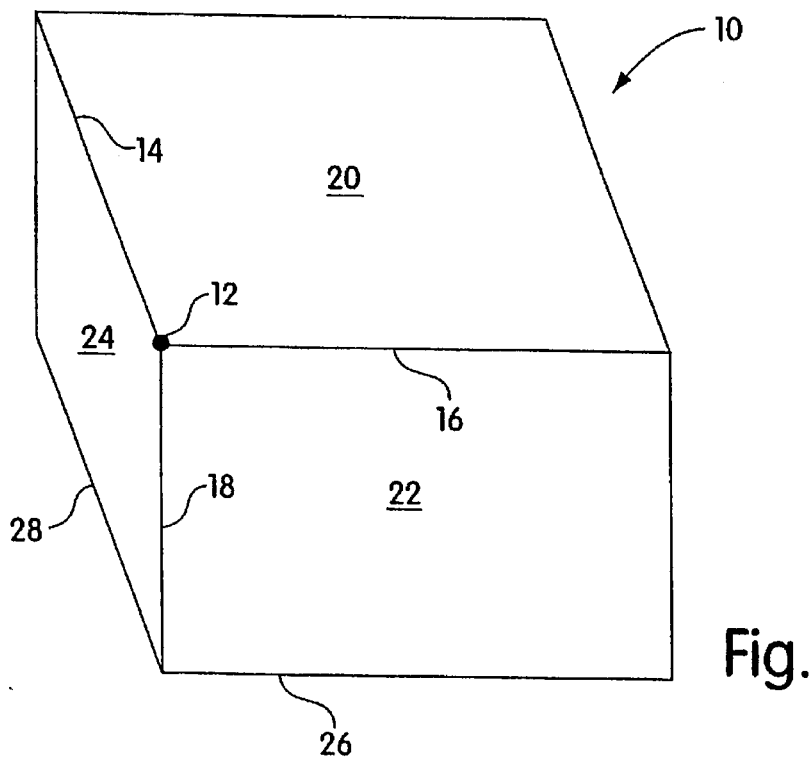
FIG. 1 is a pictorial of a cube showing various geometric entities and their relationship to each other.
Figure 2A:
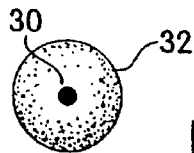
FIGS. 2a, 2b, and 2c are pictorial representations of various geometric entities and their corresponding Mintol or Maxtol volumes.
Figure 2B:
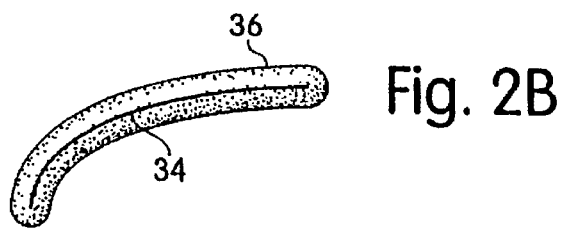
Figure 2C:
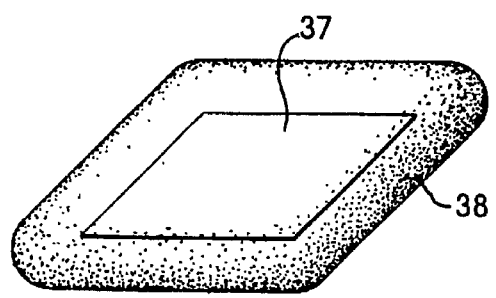

FIGS. 2A, 2B, and 2C illustrate the volumes associated with an exemplary vertex, edge, and face, respectively, defined by such a distance, be it Mintol or Maxtol. As shown in FIG. 2A, the volume associated with a vertex 30 by virtue of Mintol or Maxtol is a sphere 32. As shown in FIG. 2B, the volume associated with an edge 34 by virtue of Mintol or Maxtol is a tube 36 (or cylinder) centered about the curve 34. The volume associated with a surface 36 by virtue of Mintol or Maxtol is a slab-like volume 38, as shown in FIG. 2C.

Figure 3:
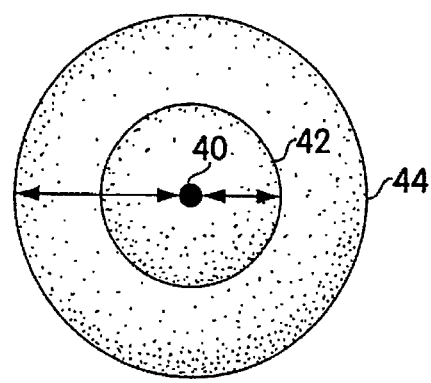
FIG 3 is a pictorial representation of a vertex, including its Mintol and Maxtol volumes.

FIG. 3 is a pictorial representation of a vertex 40, including its Mintol 42 and Maxtol 44 volumes. As can be seen in the figure, the vertex 40 has a smaller spherical volume 42 corresponding to Mintol and a larger spherical volume 44 corresponding to Maxtol. For reasons which will be explained below, Maxtol is maintained to be larger than Mintol at all times. In the preferred embodiment, Maxtol is maintained at a minimum of two times Mintol. Both Mintol and Maxtol represent a level of uncertainty in the exact position of the corresponding entity. The two values, however, represent different levels of uncertainty.

Mintol

A Mintol for each topological entity is set upon the creation of the entity. A new entity can be created under the express instruction of a user or, as will become clear from the discussion below, a new entity also is created whenever two entities are joined. The entity created by the joining of two entities may be an entirely new additional entity or it may be a replacement for one of the joined entities. The replacement of an entity due to joining may sometimes be referred to herein as moving the old entity. However, it should be understood that the actual operation involves deletion of the old entity and creation of the same type of entity in a new position.

A topological entity which corresponds to a simple geometric entity, such as a vertex or an edge which comprises a simple curve (e.g., a line or a first order arc), typically is created with no error associated therewith. In other words, the entity can be defined with an exact equation which is accurate to the maximum accuracy provided by the system. Such entities should be assigned a Mintol of zero. The creation of more complex entities such as splines or NURB curves or sculptured surfaces usually results in an equation which is an approximation rather than an exact equation. For complex entities, a Mintol value is assigned which will define the volume corresponding to the accuracy of the approximation. The accuracy of the approximation usually can be directly calculated, for example by measuring at various sampled points along the curve. However, in certain circumstances, the accuracy itself may be estimated.

The simple movement of an entity also may reduce the accuracy to which the position of the entity is known. The accuracy of a moved entity also can be directly calculated.

Finally, the joining of two entities will result in the creation of a new entity which must be assigned a Mintol value which represents the accumulated error of the two joined entities. A joining operation occurs when a topological entity is created, or an existing entity is moved, close to another entity such that they are within their combined Maxtols, as will be more fully discussed below in the section concerning Maxtol. Actual operations for joining entities, once the decision to do so has been made, are known in the prior art and are not discussed herein in detail. The assignment of a Mintol value to an entity created by the joining of two parent entities requires knowledge of the Mintol values of the parent entities.

As an example, an edge may be created by the intersection of two sculptured surfaces. An equation for the curve of that edge is calculated by selecting a number of points along the intersection and fitting a curve to the points. In the preferred embodiment, the user can select the accuracy of the curve which is fitted, for instance, by having the option of selecting the number of points per unit distance used for the fitting of the curve. The shortest distance from each point to each surface to which it is joined plus the Mintol of the surface can be calculated directly. The maximum distance calculated in this manner is the minimum value which should be assigned as the Mintol of that edge. However, a larger value can be assigned, if desired.

If two of the same type of entity are adjacent in their entireties, they will be merged into a single entity. When only a portion of an entity is adjacent another entity, the two entities are intersected, rather than merged into a single entity. The way in which two entities are joined depends on the types of entities and the extent of their intersection. For instance, two vertices cannot be intersected. If two vertices are adjacent, they are merged into a single vertex.

Figure 9:
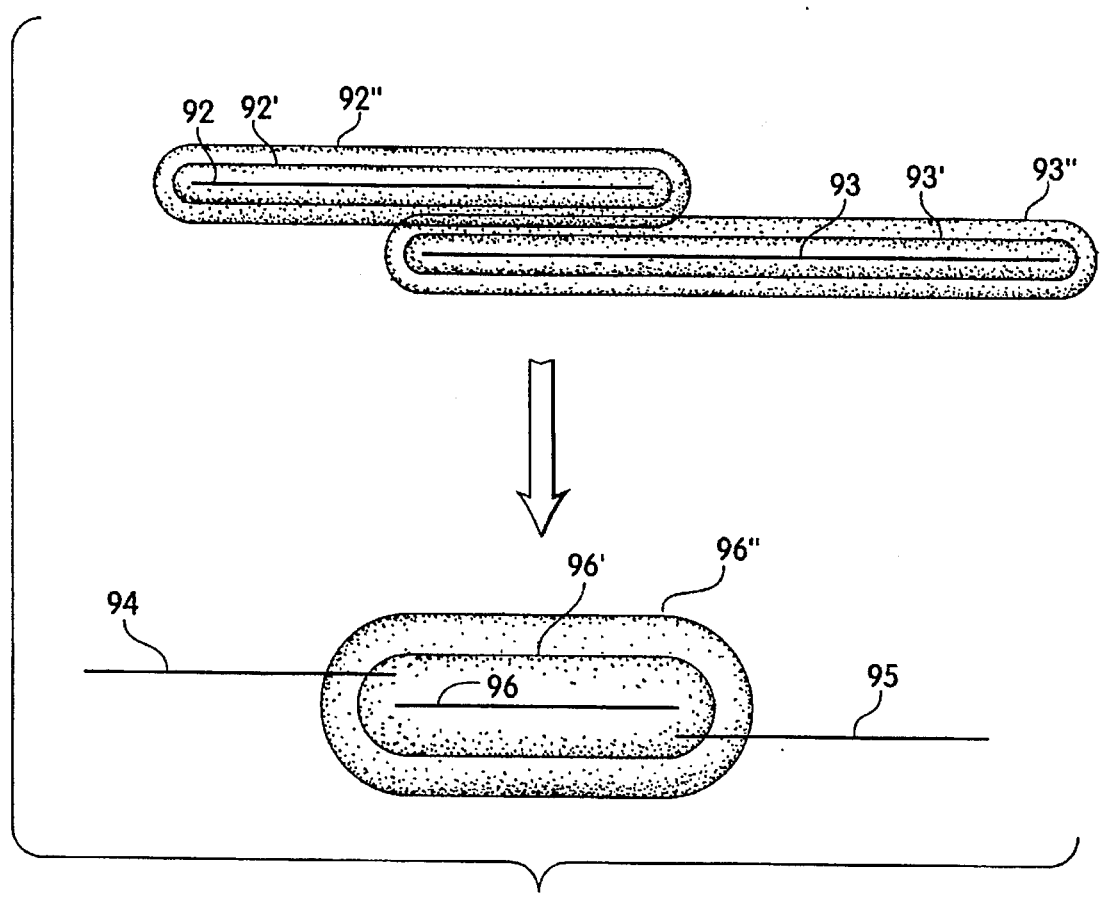

As another example, the intersection of two edges which cross each other at a point results in the creation of a vertex where the two edges meet. If the two edges meet at their respective ends, only a vertex is created (in this example, the new vertex being a replacement for the vertices at the intersecting endpoints of the two edges). However, if two edges intersect intermediate their ends, for instance, as in the letter X, in which two lines (edges) cross each other intermediate the ends of each line, not only is a new vertex created at the point of intersection, but the two original intersecting edges are split at the point of intersection. Accordingly, that particular intersection results in the creation of a new vertex and the splitting of each of the two original edges into two separate edges for a total of four edges which meet at the intersection defined by the new vertex. Two edges also may be coincident over a specified distance (but not their entire distance). In such a situation, the two entities are intersected over a finite length, rather than at a single point. In particular, the adjacent portions of the two parent edges are deleted and replaced by a new edge which is the geometric average of the coincident portions of the parent edges. The non-coincident portions of the two parent edges remain (as redefined by the deletions by the coincident portions) and are joined to the vertices at the opposite ends, respectively, of the new edge. FIG. 9 illustrates this concept and is discussed in detail below.

As another example, the intersection of two surfaces (not in their entirety) typically results in the creation of a new edge or edges which define the intersection. There are known methods for creating curves from the intersection of two surfaces. One such method involves the determination of the coordinates of a plurality of points on the intersection of the two surfaces and fitting a curve through those points. Other techniques also are known. Of course, the coincident portions of two intersecting surfaces also may be a surface rather than an edge.

When two entities become joined (i.e., merged or intersected), the Mintol of the entity resulting from the joining must be calculated to enclose the Mintols of the merged or intersected portions of the parent entities.

Figure 4:
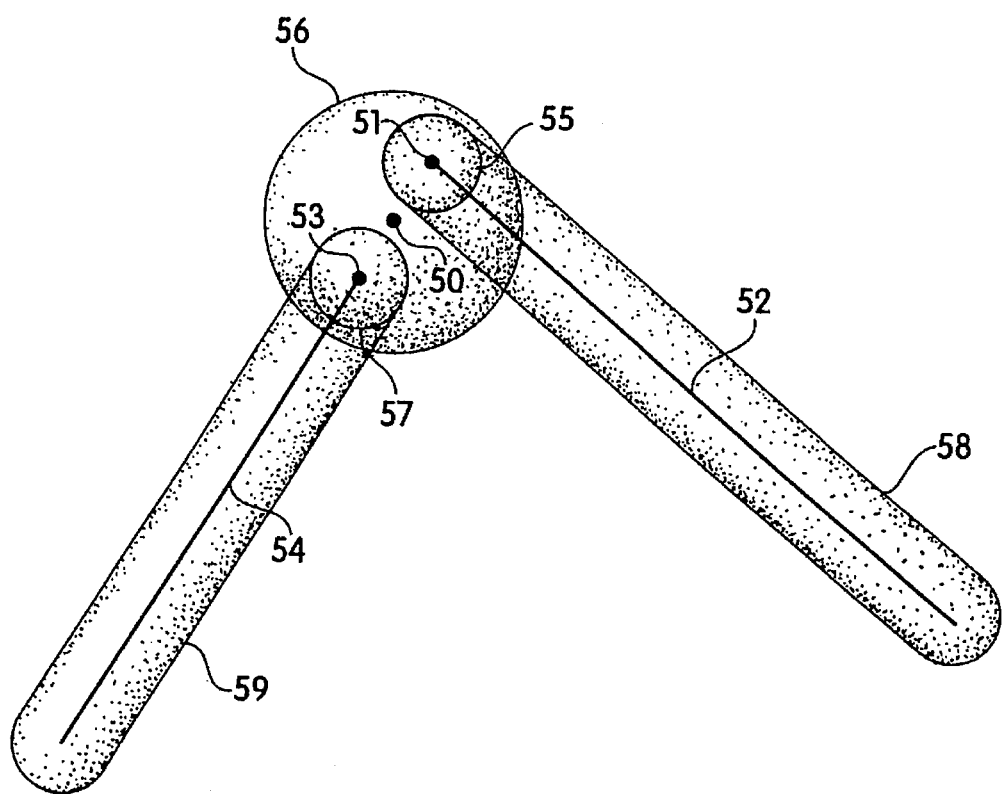
FIG. 4 is an enlarged view of a vertex and two adjacent edges illustrating related Mintols.

FIG. 4 is helpful in illustrating this concept. When two or more entities are intersected or merged, it is possible that the actual equations in the dataset which define those entities did not cause the entities to intersect exactly. Instead, the equations defining the geometric shapes and positions of the entities may cause them to come very close to each, but not actually to intersect. FIG. 4 shows a vertex 50 formed by the intersection of the ends of edges 52 and 54. However, as shown in the figure, the equations of edges 52 and 54 cause the two edges to not actually intersect, but to come within a distance of each other which is less than the sum of the Maxtols of the two edges. As discussed more fully below in the discussion of Maxtol, two entities which pass within the sum of the Maxtols of the two entities are to be joined (either intersected or merged). FIG. 4 does not show the Maxtol volumes in order not to obfuscate the discussion of Mintol. Maxtol will be discussed later herein. After the entities are joined (in this example they are intersected and result in the creation of vertex 50), the fact that edges 52 and 54 do not actually intersect at the vertex 50 is an error (or gap) in the model. The Mintol 56 of the vertex 50 must completely enclose the volumes within original Mintols 55 and 57, respectively, of the vertices 51 and 53 at the endpoints of the edges 52 and 54, respectively.

The Mintol of a vertex is the minimum distance from the point of the vertex that will enclose the Mintols of the endpoint vertices of every entity joined to that vertex. More generally, the Mintol of an entity which defines the intersection or merger of two or more other entities is the minimum distance from that entity that will enclose the Mintols of the joined (i.e., intersected or merged) portions of the entities which are joined.

The ability to calculate and store the accumulated error associated with a topological entity enables the system to produce a consistent representation between topology and geometry, effectively "closing" the model. The invention also allows importation of solids from other geometric modeling systems which may have different tolerance assumptions and geometric computation techniques.

The following are examples of editing operations which require Mintol to be recalculated; (1) the insertion of a new edge to a vertex, (2) the splitting of an edge into two edges, and (3) the merging of two topological objects. Of course, the recalculation of Mintol does not necessarily mean that its value will be changed. If the current Mintol value associated with a topological entity is already large enough to enclose all adjacent entities, then its value need not be changed. Generally, Mintol will be changed only to increase its value. The only operations which normally should result in decreasing Mintol is the undoing of an operation which caused the Mintol value to be increased.

Maxtol

Maxtol is a second distance value associated with each topological entity which has a relationship to a geometric entity. Mintol and Maxtol are interdependent. In particular, the Maxtol values of the topological entities dictate whether those entities are adjacent and should be joined. If Maxtol indicates that those entities are adjacent, then the necessary data corresponding to the entities are sent to a mathematical function that performs the actual joining. In the present invention, after two entities are joined, the system then calculates Mintol and Maxtol values for the entity created by the joining. The operation of merging two entities may cause one of the entities to be selected and the other deleted so that only one entity remains. More preferably, an average of the two entities is taken to create a third entity while the first two entities are deleted. In the case of an intersection, as opposed to a merging, it is preferable that the new entity is positioned at the average between the intersecting portions of the joined entities.

Maxtol is always larger than the corresponding Mintol. Maxtol represents the operational tolerance of the entity for future operations relating to that entity. The Maxtol of an entity is used to determine whether that entity is close enough to another entity so that the two entities should be joined. The combined Maxtol values of two entities determines whether those entities will be joined (i.e., either merged into a single entity or intersected, as the particular case dictates). If the shortest distance between two entities is less than the sum of the Maxtols of the two entities, then the system will join the two entities. More particularly, if the shortest distance between two entities is less than the sum of the Maxtols of the two entities and either (1) the entities are of different types or (2) the entities are of the same type but are not within the sum of the Maxtols of the two entities in the entirety of at least one of the entities, the two entities are intersected. If, on the other had, two entities are of the same type and at least one of the entities is entirely within the sum of the Maxtols of the two entities, the two entities are merged into a single entity. For example, if two vertices are within a distance of each other which is less than the sum of the Maxtols of the two vertices, they will be merged into a single vertex.

Vertices are never intersected since, by definition, if two vertices are within the sum of the Maxtols, they are entirely within the sum of their Maxtols. In the preferred embodiment of the invention, the two vertices to be joined will be replaced y a single vertex which is in a position that is the average of the two parent vertices. Alternately, one of the vertices can be selected to be the resulting single vertex while the other is deleted.

On the other hand, edges and faces may be either intersected or merged. The intersection of two edges usually results in the creation of a new vertex which defines the intersection and, as previously noted, will result in the breaking up of a single edge into two edges, if the intersection point is intermediate the two ends of the original edge. However, also as previously noted, the adjacency of two edges could also be defined by another edge.

The intersection of two faces typically results in a curve (which may be associated with one or more edges) which defines the intersection of the two surfaces. However, it is possible for the intersection of two faces to be a face itself.

Figure 5:
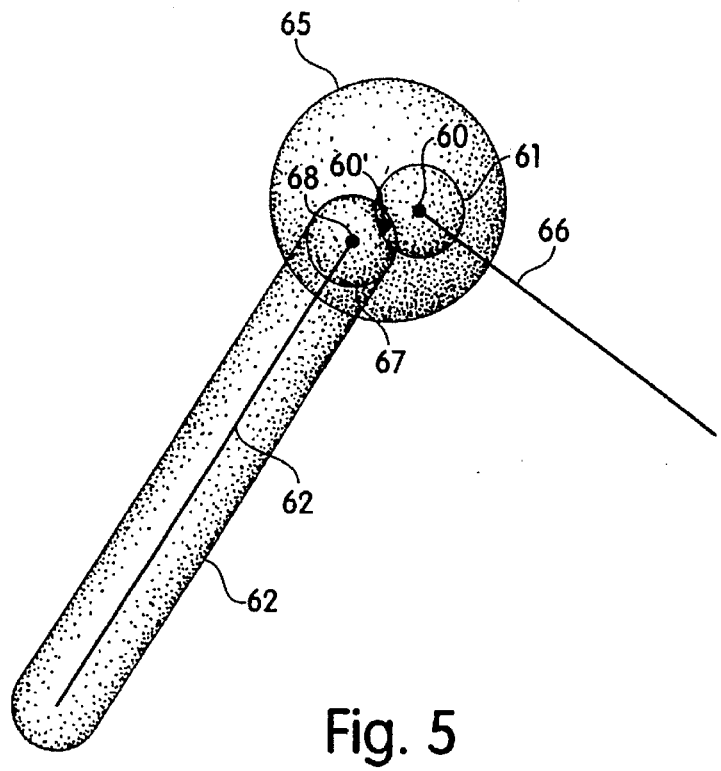
FIG. 5 is an enlarged view of a vertex and two adjacent edges illustrating related Maxtols.

The following is a discussion of an exemplary manner of joining an edge to a vertex and the effect of the joining on the relevant Maxtol values as illustrated in FIG. 5. First, the shortest distance between the vertex 60, which already is joined with edge 66, and the edge 62 must be calculated. If that distance is less than the sum of the Maxtols 61 and 63 of the vertex 60 and the edge 62, respectively the vertex (and thus also edge 66) is joined with the edge 62. In the preferred embodiment of the invention vertex 60 is moved to a new position 60' which is the average of the intersecting points of the entities joined at that vertex. In the example in FIG. 5, it is the average of the end points 60 and 68 of edges 66 and 62, respectively. When two entities are joined, a Maxtol must be assigned to the new entity which is created by the joining of the parent entities. A Maxtol value must be assigned to the new entity which completely encloses the Maxtol volumes of the joined portions of the parent entities.

Thus, as shown in FIG. 5, vertex 60' is assigned a Maxtol value as illustrated by sphere 65, which encloses Maxtol volumes 61 and 67.

Likewise, a new Mintol value must be calculated which completely encloses the Mintol volumes of the intersecting portions of the parent entities. FIG. 5, however, does not show the Mintol volumes in order not to obfuscate the discussion of Maxtol.

Upon creation of an entity other than by the joining of two other entities, a default Maxtol value is assigned. In the preferred embodiment, the user of the system can select the default Maxtol value, e.g., $1.0e^{-6}$. In fact in the preferred embodiment of the present invention the user is allowed to select different default values for the different types of geometric entities (e.g., point, curve, face). As will be explained further below, Maxtol must be larger than Mintol and, in the preferred embodiment is maintained at no less than two times the Mintol for the corresponding entity. As noted earlier, some entities are assigned a non-zero Mintol value upon creation. Accordingly, the Maxtol value assigned to an entity upon creation in certain circumstances cannot be the default value and must be a larger value in order that it be at least two times the Mintol value of the corresponding entity.

Features

Figure 6:
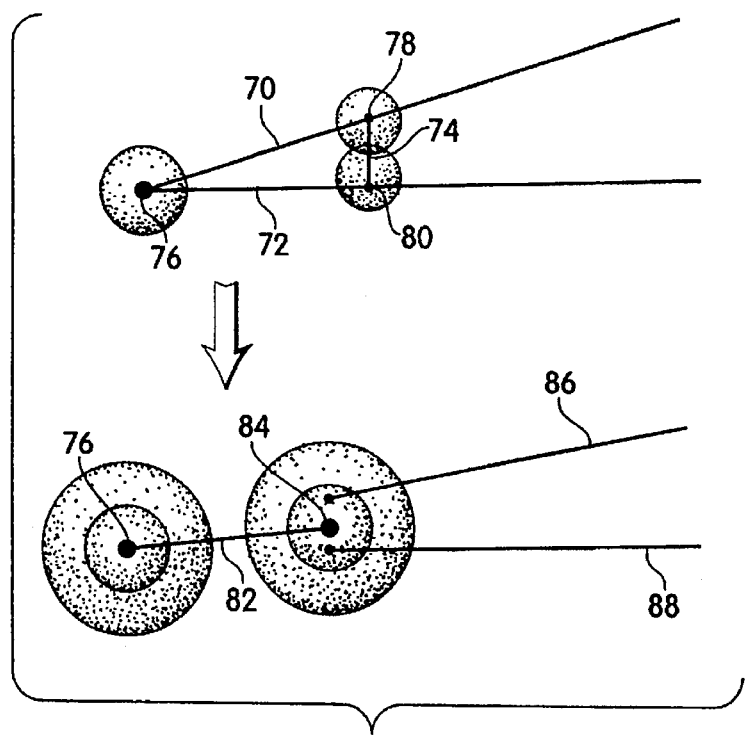
FIG. 6 is a pictorial of a particular collection of geometric entities showing an exemplary manner in which the present invention would combine them and generate new Mintol and Maxtol valves.

An additional feature of the invention is the ability to delete other entities when two entities are joined. For instance, if an edge is so short that the Maxtol volumes of the vertices at opposite ends of the edge overlap, those points are merged and the edge is deleted from the dataset. FIG. 6 illustrates a more involved example. FIG. 6 shows a model comprising edges 70, 72 and 74 and vertices 76, 78 and 80. The circles around vertices 76, 78 and 80 represent the Maxtol volumes of those vertices. As shown, the volumes of vertices 78 and 80 overlap. Accordingly, vertices 78 and 80 will be merged into new vertex 84, and edge 74 will be deleted. In addition, edges 70 and 72 will be merged between vertices 76 and 84 thus replacing parent edges 70 and 72 with new edges 82, 86 and 88.

Another feature is that the user can query the system for the Mintol value of any particular entity or to determine the system average or the greatest Mintol in the model. If the user finds a particular Mintol value to be unacceptable, he can revisit the relevant entities and have an intersection re-performed or an entity created with a more accurate equation. For instance, if the intersection of two surfaces results in an edge having a Mintol greater than desired, the user can go back and have the edge recalculated to greater accuracy by specifying a greater number of points per unit length when creating the edge.

In the preferred embodiment, the user specifies his desired Maxtols at the beginning of the modeling project. As noted, he can set different Maxtols for different entities. He can also set a maximum Maxtol value which informs the system that the user does not wish any Maxtol value in the system to exceed that specified value. The system would then alert the user if an operation resulted in a Maxtol value for an entity greater than the specified maximum. The user could then have the operation re-performed more accurately. However, in general, Maxtol operates transparently to the user.

The present invention, with its variable tolerances, allows for importation of data from other systems and adaptation of the model on this system to the tolerances of the imported data. When data is imported from another system, the imported data must be traversed and each entity examined and a Mintol value and Maxtol value calculated and assigned for each topological entity having a corresponding geometric entity.

Rules of Operation

Certain rules apply to the creation and recalculation of Mintol and Maxtol in order to control their individual behaviors and their relationship to each other. In particular, if certain rules of behavior and interaction between Mintol and Maxtol are not maintained, the model may fail. The following is a preferred list of rules of behavior and the reasons for each rule.

Rule 1

Maxtol must be greater than Mintol.

Reason for Rule

This rule is desirable because the accumulated error of an entity (i.e., Mintol) essentially defines a volume within which the entity is known to exist, but the entity's position within that volume in not exactly known. Accordingly, the acceptable tolerance for that entity, i.e., Maxtol, essentially by definition must be defined as a volume larger than Mintol. In fact, since, in some circumstances, Mintol itself can be an approximation with as much as a 10% margin of error, Maxtol should be at least 10% larger than Mintol. In the preferred embodiment, Maxtol is maintained to be at least two times Mintol.

Rule 2

The Maxtol of a vertex must be greater than or equal to the Maxtol of the edges which are joined to that vertex and must completely enclose the volumes within the original Maxtols of the endpoints of the edges which are joined to that vertex.

Reason for Rule

The reason for this rule has been discussed previously. In particular, the Maxtol of the vertex must meet this limitation in order that entities joined to the parent entities also are joined to the vertex.

Rule 3

The Maxtol of an edge must be greater than or equal to the Maxtol of the surfaces which are joined to that edge and must completely enclose the relevant sides of the Maxtol slabs of those surfaces.

Reason for Rule

This rule is a result of the same concerns discussed above with respect to Rule 2.

Rule 4

Two topological entities of the same type which are completely within their combined Maxtol volumes must be merged.

Reason for Rule

If two entities of the same type are completely within their combined Maxtol volume, they are merged rather than intersected. If this rule is not followed consistently, the model will be inconsistent and possibly fail. Two entities of the same type which are completely within their combined Maxtol volumes are essentially indistinguishable from each other in the system and cannot validly coexist.

Rule 5

The entity resulting from the joining of two entities must have a Mintol volume which encloses the Mintol volumes of the joined portions of the original objects.

Reason for Rule

Mintol represents the accumulated error of an entity. The accumulated error of an entity created by the joining of two parent entities is no less than the combined accumulated error of the parent entities.

Rule 6

The entity resulting from the joining of two parent entities must have a Maxtol volume which encloses the Maxtol volumes of the joined portions of the parent entities.

Reason for Rule

The reason for this rule already has been discussed. Particularly, this rule assures that entities which were previously joined to a parent entity will remain joined to the parent entity or a resulting new entity after the operation. This will result in inconsistent modeling.

Discussion

Although the methods and means by which entities are joined in geometric modeling are known in the prior art and are not, per se, the subject of the present invention, the assignment of Mintol and Maxtol volumes for a topological entity is intimately related to these operations. Accordingly, the discussion below generally outlines the most relevant aspects of the joining of entities in geometric modeling as well as how the joining of entities affects the Mintols and Maxtols of the related entities.

There are six permutations of the basic topological entities which can be joined. They are:

1. vertex-vertex
2. vertex-edge
3. vertex-face
4. edge-edge
5. edge-face
6. face-face Vertex-Vertex When two vertices are joined, they are always merged since, by definition, two vertices which are adjacent are always adjacent in their entireties. When two vertices are merged, both original vertices are deleted and replaced by a new vertex which is positioned at the geometric average of the two original vertices. The Mintol of the new vertex encloses the Mintols of the parent vertices. The Maxtol of the new vertex encloses the Maxtols of the original vertices. Of course, the limitation of the preferred embodiment that Maxtol be at least two times Mintol may require that Maxtol be larger than necessary to simply enclose the parent Maxtols.

Vertex-Edge

A vertex and an edge cannot be merged since they are different types of entities. When a vertex and an edge are intersected, the vertex is deleted and replaced by a new vertex which is positioned at the geometric average of the entities joined to the vertex. If the vertex is joined to the edge intermediate the ends of the edge, then the edge is split into two. Otherwise, the edge is not affected. The Mintol and Maxtol of the edge is not modified. The Mintol of the vertex is modified to enclose the Mintols of (1) the original vertex and (2) the edge at the point of intersection on the edge. The Maxtol of the vertex is modified to enclose the Maxtols of (1) the original vertex and (2) the edge at the point of intersection of the edge.

Vertex-Face

A vertex and a face cannot be merged because they are different types of entities. When a vertex and a face are intersected, the face is unaffected. The vertex, however, is deleted and replaced by a new vertex which is at the geometric average of the original vertex and the point of intersection on the face. The Mintol and Maxtol of the face are not affected. The Mintol of the new vertex is calculated to enclose the Mintols of the original vertex and the face at the point of intersection on the face. The Maxtol of the vertex is modified to enclose the Maxtol of (1) the original vertex and (2) the face at the point of intersection on the face.

Edge-Edge

Two edges can be (1) joined in their entirety (merged), (2) joined at one or more separate vertices (intersected) and/or (3) joined over a portion of their lengths (termed herein an extended intersection). When two edges are merged or extended intersected, the adjacent portions of the two original edges are deleted and a new edge is created which is positioned at the geometric average of the intersecting portions of the original edges. If it is an extended intersecting, the original edges are redefined as the portions of the original edges which remain after the intersecting portions are deleted. The vertices at the end points of the new edge are joined to the vertices at the adjacent end points of the now redefined original edges and are treated as discussed above in the vertex-vertex section. The Mintols and Maxtols of the redefined original edges are the same as the original edges. The Mintol of the new edge which replaced the adjacent portions of the original edges encloses the Mintols of the intersecting (i.e., deleted) portions of both the original edges. The Maxtol of the new edge which replaced the adjacent portions of the original edges encloses the Maxtols of the intersecting portions of both original edges.

When two edges are intersected at a single point intermediate the ends of both of the intersecting edges, a new vertex is created and the original edges are each split into two edges radiating from the new vertex. The new edges are assigned the same Mintols and Maxtols as the original edges from which they were derived. The Mintol and the Maxtol of the new vertex are treated as discussed above in the vertex-edge section.

If two edges intersect at a point and the point of intersection on one or both edges is an end point of the edge (or edges), then the operation is actually one of intersecting two vertices rather than two edges since the endpoints of an edge are always vertices.

Edge-Face

An edge and a face cannot be merged because they are different types of entities. However, there are three possible manners in which an edge and a face may intersect. In particular, 1) an edge may be adjacent the face in its entirety, (2) an edge may intersect a face over one or more finite lengths less than the entire length of the edge and (3) an edge may intersect a face at one or more points. In the first two types of intersections, the edge will be deleted and the Mintol and Maxtol of the face will be enlarged to enclose the Mintol and Maxtol, respectively, of the deleted edge or edge portion. In the second situation listed above, in which one or more portions of the edge remain after the joining, the remaining portions of the original edge (which are now newly defined edges in the dataset) are treated as discussed below with respect to the third type of situation.

If an edge and a face intersect at a single point, then a new vertex is created at the geometric average of the intersection points of the edge and face. The edge is split if the intersection is intermediate the ends of the edge. The Mintols and Maxtols of the edge and face are not affected. The Mintol and Maxtol of the newly created vertex is defined to enclose the Mintols and Maxtols, respectively, of the intersection points of the edge and the face.

Face-Face

Two faces can intersect in four distinct manners. In particular, (1) two faces can be adjacent over the entire area of at least one of the faces, in which case the faces are merged, (2) two faces can be adjacent over a finite two-dimensional area which is less than the entirety of either face, (3) two faces can intersect along a 1-manifold curve, and (4) two faces can intersect at a zero-manifold point. In either of the first two instances mentioned above, the adjacent portions of the two faces are deleted and replaced by a new face which is the geometric average of the adjacent portions of the two original faces. The original faces are redefined as the remainders of the original parent faces, if any, after the joining. The redefined original faces are joined to the new average face at the appropriate edge(s) and vertex/vertices. The Mintols and Maxtols of any remaining redefined original faces are unaffected. The Mintol and Maxtol of the newly created average face are set to enclose the Mintols and Maxtols, respectively, of the adjacent portions of the original faces. The Mintols and Maxtols of any newly created edges or vertices are treated as discussed above in the appropriate sections.

Finally, when two faces intersect each other along only a one-dimensional edge or at a point, a new edge or vertex is created positioned at the geometric average of the intersecting portion of the two faces. If the intersection is intermediate the edge of one or both faces, the face or faces may be split. The Mintols and Maxtols of the intersecting faces are not affected (if a face is split, the two faces resulting therefrom are assigned the same Mintols and Maxtols as the original face). The Mintol and Maxtol of the newly-created (or redefined) edge is set to enclose the Mintols and Maxtols, respectively, of the intersecting portions of the parent faces.

Flow Charts

Figure 10:
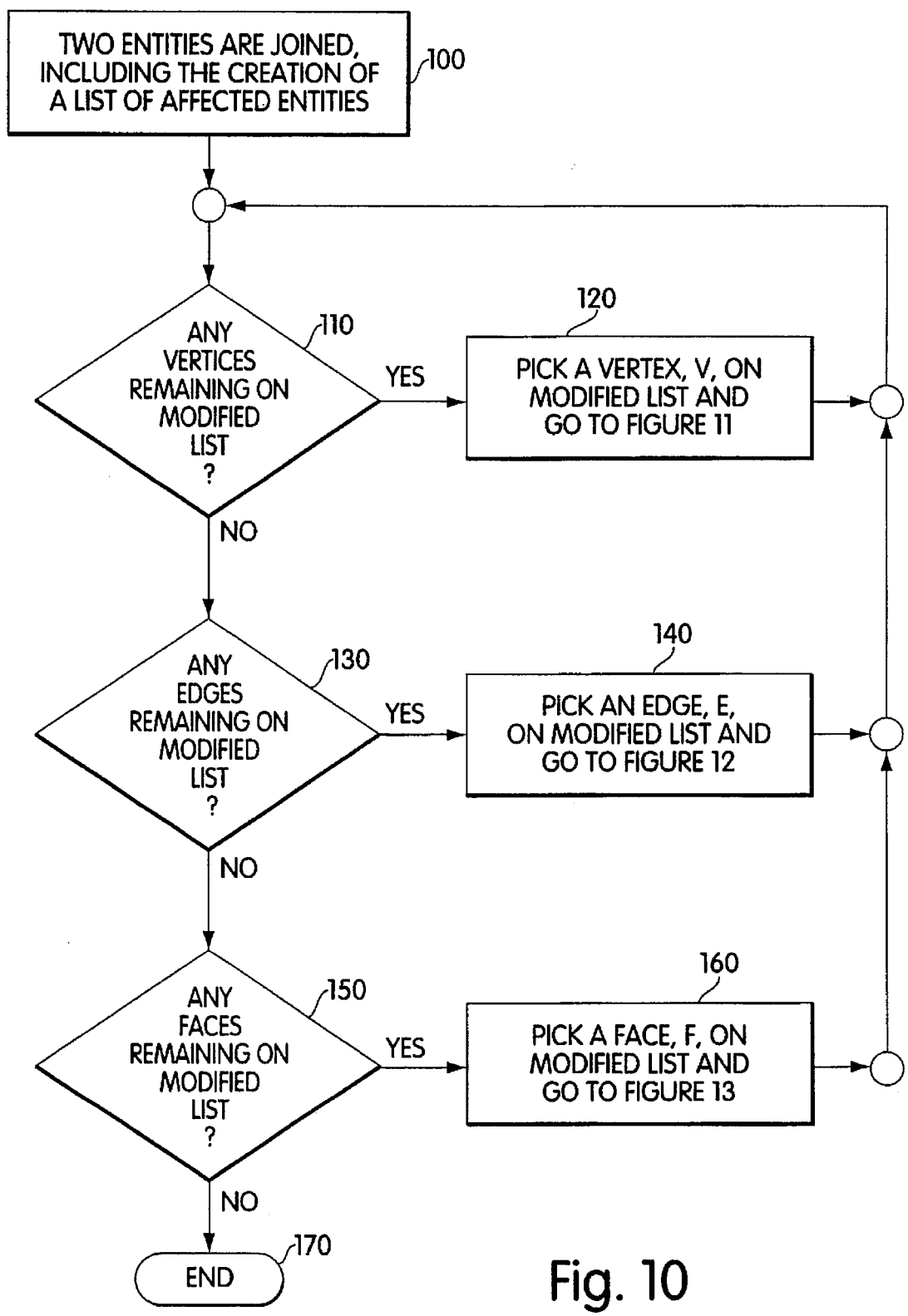
FIG. 10 is a flow chart illustrating an exemplary scheme for creating and modifying mintol and mextol values of a vertex, and edge, and a face.
Figure 11:
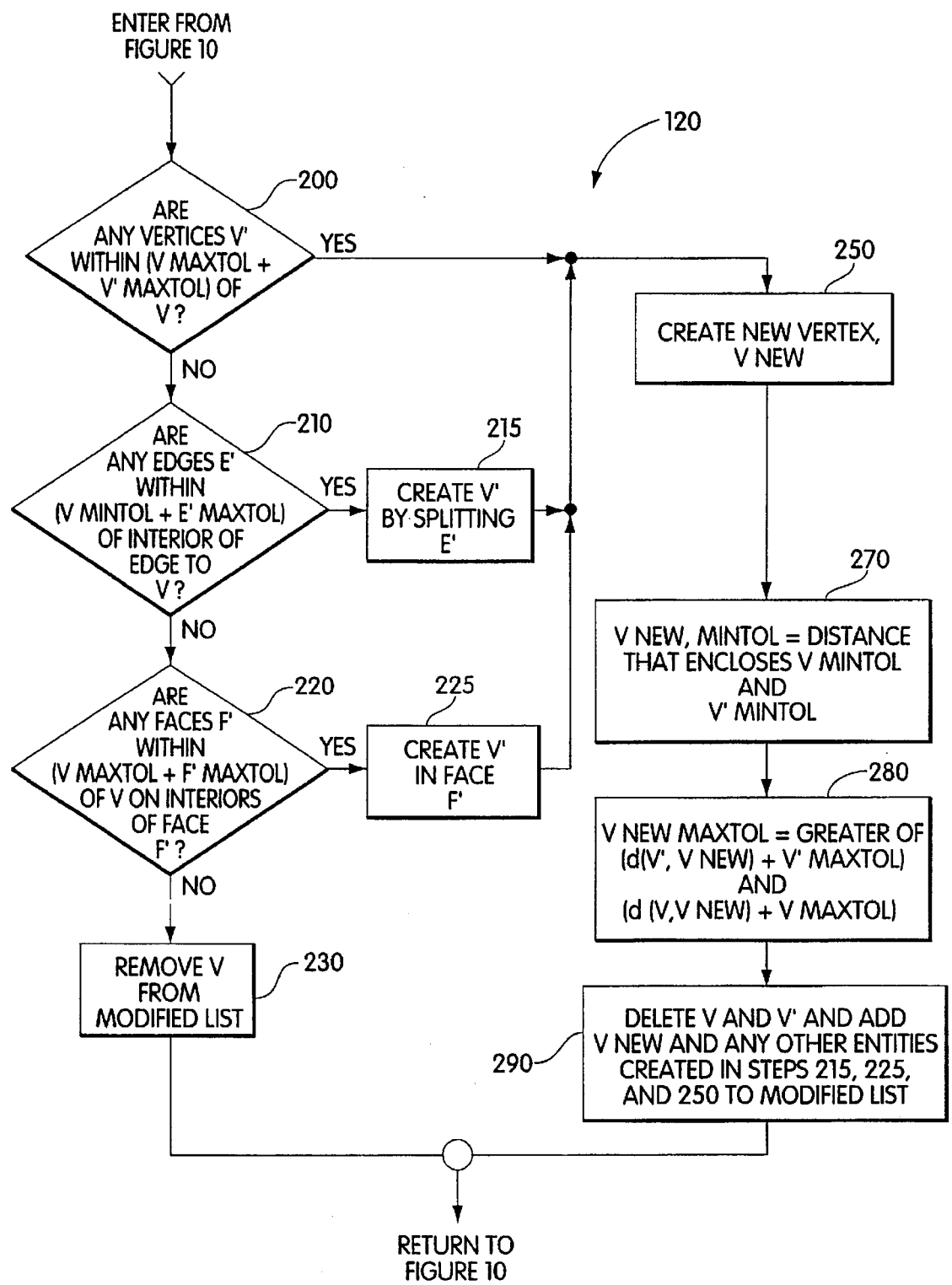
FIG. 11 is a flowchart illustrating an exemplary scheme for creating and modifying Mintol and Maxtol values of a vertex.
Figure 12:
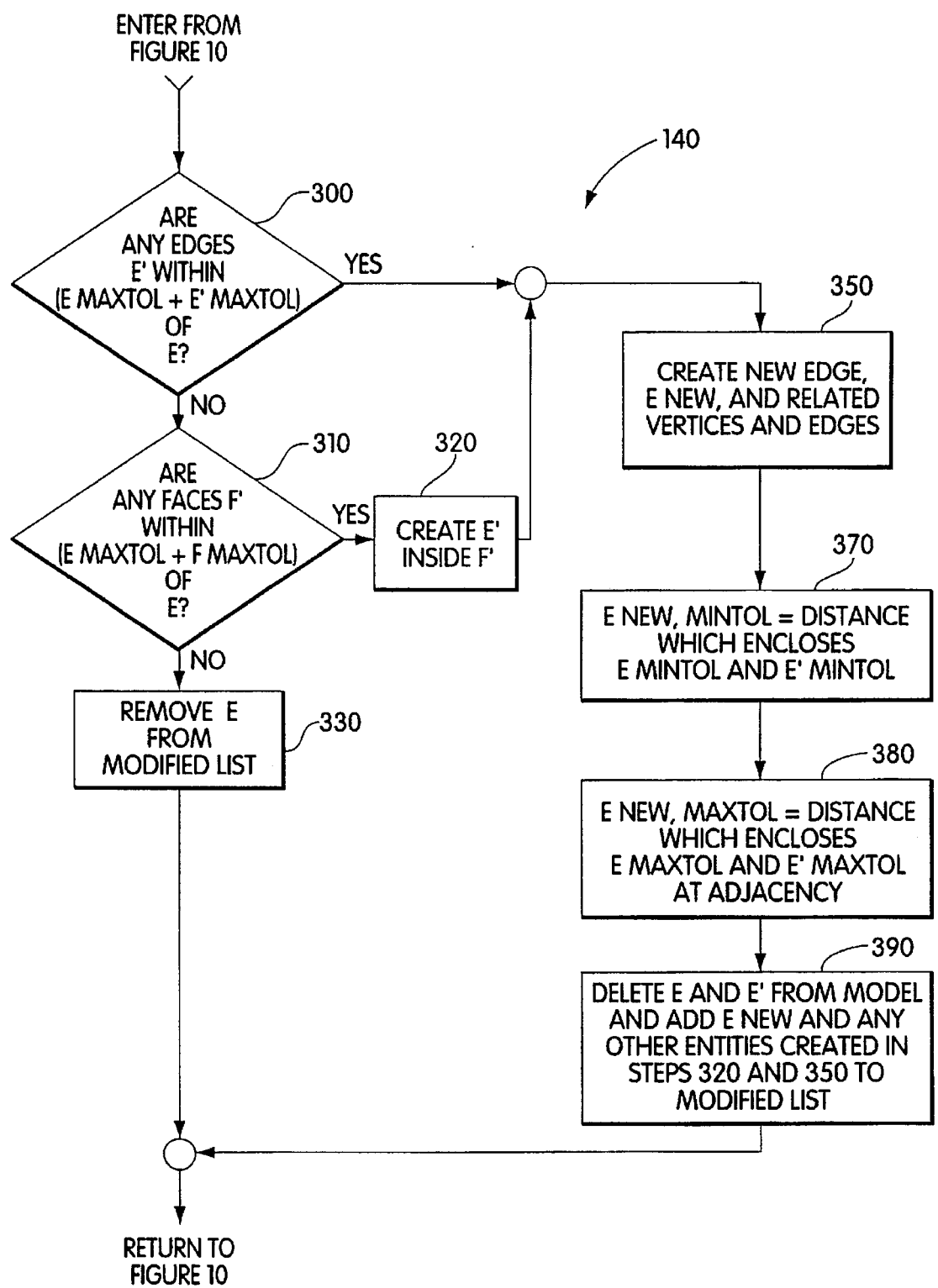
FIG. 12 is a flowchart illustrating an exemplary scheme for creating and modifying Mintol and Maxtol values of an edge.
Figure 13:
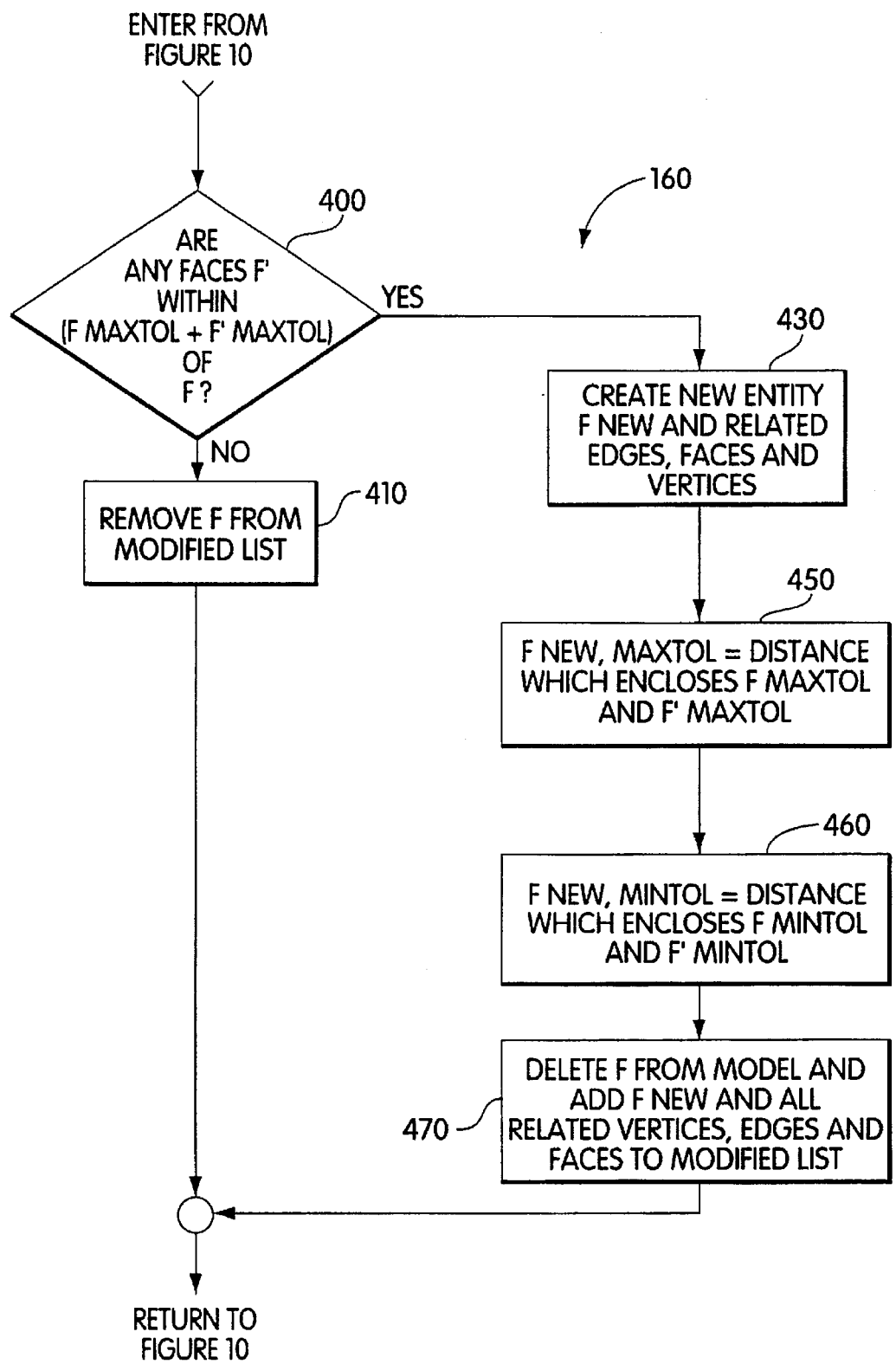
FIG. 13 is a flowchart illustrating an exemplary scheme for creating and modifying Mintol and Maxtol values of a face.

FIGS. 10-13 are flowcharts illustrating an exemplary set of operations for selecting the Mintol and Maxtol values of an entity after the joining of a newly-created or modified entity with another entity. The routine is entered whenever two entities are joined, as indicated at step 100 in FIG. 10. As previously noted methods are known in the prior art for joining entities. The process of joining two entities includes the creation of a list of the entities which were affected by the joining of the entities. The list is hereinafter termed the Modified List. In step 110, it is determined if there are any vertices on the Modified List. If so, one of the vertices, V, on the Modified List is chosen and operation flows to the steps shown in FIG. 11. Step 120 in FIG. 10 represents this selection process as well as the routine which is shown in more detail in FIG. 11. Referring now to FIG. 11, in step 200 it is determined if there are any vertices V' within the combined Maxtol distances of the vertices V and V' of vertex V. If there is, operation flows to step 250 where a new entity, $V_{new}$ is created and at the geometric average of V and V'. Processing then flows to step 270, where $V_{new}$ is assigned a Mintol which is the minimum distance from $V_{new}$ which encloses all adjacent edge ends and their Mintols and the closest points of all adjacent faces and their Mintols. Processing then flows to step 280 where $V_{new}$ is assigned a Maxtol which is the greater of 1) the distance between V' and $V_{new}$ plus the Maxtol of V' and 2) the distance between $V_{new}$ and V plus the Maxtol of V. Processing then flows to step 290 where vertices V and V' are deleted from the model, including from the Modified List, and $V_{new}$ and any other entities created during the operation represented in FIG. 11 (as may occur in steps 215 and 225 to be discussed later) are added to the Modified List. Accordingly, although V is deleted from the Modified List, it is replaced thereon by at least $V_{new}$ as well as other possible entities which must go through the process represented by FIG. 11 again.

After step 290, processing returns to step 110, as illustrated in FIG. 10, and the process of FIG. 11 is repeated for every vertex on the Modified List (which list now includes $V_{new}$). In a preferred embodiment, in step 120, any vertex created during the immediately preceeding pass through step 120, i.e. $V_{new}$, is selected until step 120 is traversed without the creation of a new vertex. When the outcome of decision step 200 in FIG. 11 is no for a given vertex, operation will flow to step 210. In step 210, it is determined if any edge E' passes within a distance to selected vertex V which is less than or equal to the sum of the Maxtols of edge E' and vertex V. If so, processing flows to step 215 where a vertex V' is created by splitting edge E'. This step includes the redefinition of the parent edge E' into two smaller edges as well as the creation of vertices at the ends of those edges. Processing then proceeds through steps 250-290 to produce a new vertex, $V_{new}$ and assign it Mitol and Maxtol values and to add the entities created in steps 215 and 250 to the Modified List.

When a vertex, V, on the Modified List is finally selected for which there are no vertices V' or edges E' within the specified distance to it, processing flows to step 220 in FIG. 11.

In step 220, it is determined whether there are any faces F' which pass within a distance of V which is less than the combined Maxtols of F' and V. If so, processing flows to step 225. In step 225, a vertex V' is created in face F' at the point in face F' which is closest to vertex V. Additional entities may also be created as discussed above with respect to step 215. Processing thereupon proceeds through steps 250-290 and then back to 110 as previously noted. Finally, when a vertex, V, from the Modified List is selected in step 120 which does not have any other vertices, edges or faces within the specified Maxtol sums, it is removed from the Modified List without being replaced by anything else (step 230). Processing then returns to step 110 (as shown in step 240 in FIG. 11) so that the process can be repeated for the next vertex on the Modified List.

As illustrated by steps 110 and 120 in FIG. 10, the process shown in FIG. 11 is repeated until there are no vertices remaining on the Modified List. Processing then flows to step 130 where it is determined if there are any edges remaining on the Modified List. If so, one of the edges, E, is selected and processing flows to the routine shown in FIG. 12. In step 300 of FIG. 12, it is determined if there are any other edges E' within the combined Maxtol distances of the edges E and E'. If there is, programming flows to step 350 where a new edge, $E_{new}$, is created and assigned a geometric identity which is the geometric average of the adjacent portions of E and E'. As previously discussed, the creation of a new edge such as $E_{new}$ may result in other edges being modified (such as the parent edges). It also will result in the creation of new vertices at the ends of any new or modified edges. In step 370, $E_{new}$ is assigned a Mintol value which encloses the Mintols of the joined portions of E and E'. In step 380, $E_{new}$ is assigned a Maxtol value which encloses the Maxtols of the adjacent portions of E and E'. In step 390, edge E is deleted from the model and $E_{new}$ and all other vertices and edges which were created or modified in step 350 are added to the Modified List. Processing then returns to step 110 in FIG. 10. Processing flows to step 110 because vertices may have been added to the Modified List in step 390 which will need to be processed through the routine shown in FIG. 11. Similarly to the above discussion of FIG. 11, processing will continue to flow through steps 350-390 for each and every edge on the Modified List, whether it was on the Modified List from the original joining of entities in step 100 or added in step 390.

When the result of the inquiry in step 300 is no, processing flows to step 310.

In step 310, it is determined if there are any faces F' within $(E_{Maxtol}+F'_{Maxtol})$ of E. If so, processing flows to step 340 where a new edge E' is created which defines the intersection of E with F'. Step 340 may include the creation of other entities also. Processing then flows through steps 350 through 390 for the newly created edge E'. When an edge E on the Modified List is eventually selected which does have any other edges E' or faces F' within the specified distance, processing will flow through steps 300 and 310 to step 330, where the edge E is removed from the Modified List without the addition of any other edges or vertices to the Modified List. Processing is then returned to step 110 in FIG. 10.

When there are no more vertices or edges remaining on the Modified List, processing finally flows to step 150 in FIG. 10. If there are any faces remaining on the Modified List, processing will flow to step 160 where one of the faces, F, is selected and processing flows to the routine showing FIG. 13. In step 400 of FIG. 13, it is determined if there are any other faces F' within the combined Maxtol distances of the faces F and F'. If there is, programming flows to step 15 average of the adjacent portions of faces F and '. Additionally, any number of vertices, edges, and faces may be created or modified as part of the creation of $F_w$. In step 450, $F_{new}$ is assigned a Mintol value which encloses the Mintols of the joined portions of F and F'. In step 460, $F_{new}$ is assigned a Maxtol value which encloses the Maxtols of the adjacent portions of F and F'. In step 470, face F is deleted from the model and $F_{new}$ and any other vertices, edges or faces which were created or modified in step 430 are added to the modified list. Processing then returns to step 110 in FIG. 10.

Finally, when a face is selected in step 160 for which there are no faces F' within the distance specified in step 400, processing flows to step 410. In step 410 face F is removed from the Modified List (but remains in the model) and processing is returned to step 110 in FIG.10.

When there are no more vertices, edges or faces remaining on the Modified List, the routine ends as shown at step 170 in FIG. 10.

Examples

Figure 7:
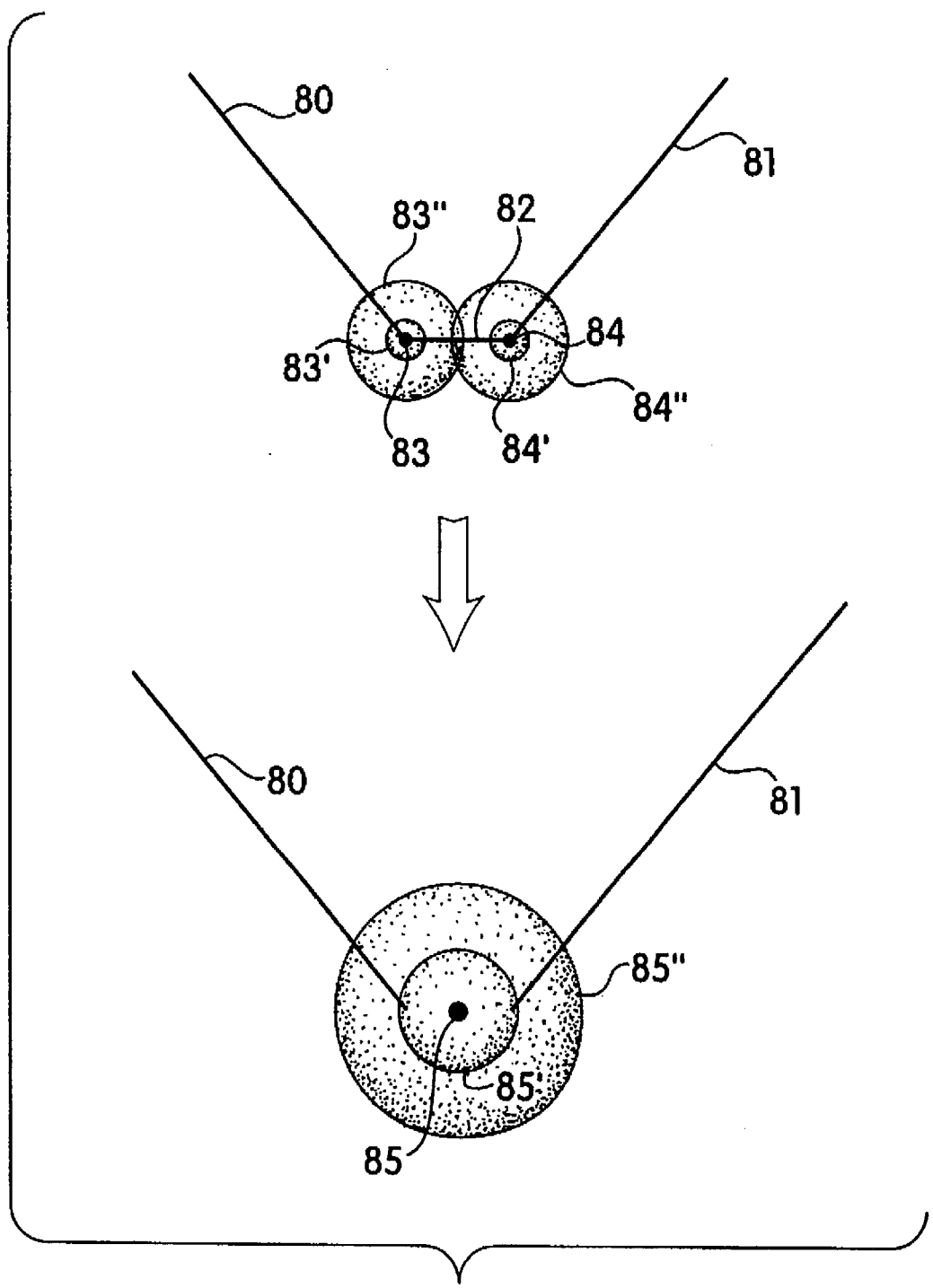
FIGS. 7–9 are pictorials of further particular collections of geometric entities showing exemplary manners in which the present invention would combine them and generate new Mintol and Maxtol values.

The following examples illustrate some of the more interesting operations relating to Mintol and Maxtol of the present invention. FIG. 7 illustrates a model comprising edges 80, 81 and 82 as shown. Vertex 83 is defined at the portion where edges 80 and 82 join and vertex 84 is defined at the portion where edges 82 and 81 join. Vertex 83 has a Mintol volume illustrated by sphere 83' and a Maxtol volume illustrated by sphere 83". Vertex 84 has a Mintol volume as illustrated by sphere 84' and a Maxtol volume as illustrated by sphere 84". As shown, vertices 83 and 84 are within their combined Maxtol volumes and the sum of the Maxtols of vertices 83 and 84 is greater than the length of edge 82. Accordingly, vertices 83 and 84 are combined to form vertex 85 at the geometric average of vertices 83 and 84. Edge 82 is deleted and Mintol 85' of vertex 85 is large enough to enclose the Mintol volumes 83' and 84' of the original vertices 83 and 84. Likewise, Maxtol volume 85" of vertex 85 is large enough to enclose the Maxtol volumes 83" and 84" of the parent vertices.

Figure 8:
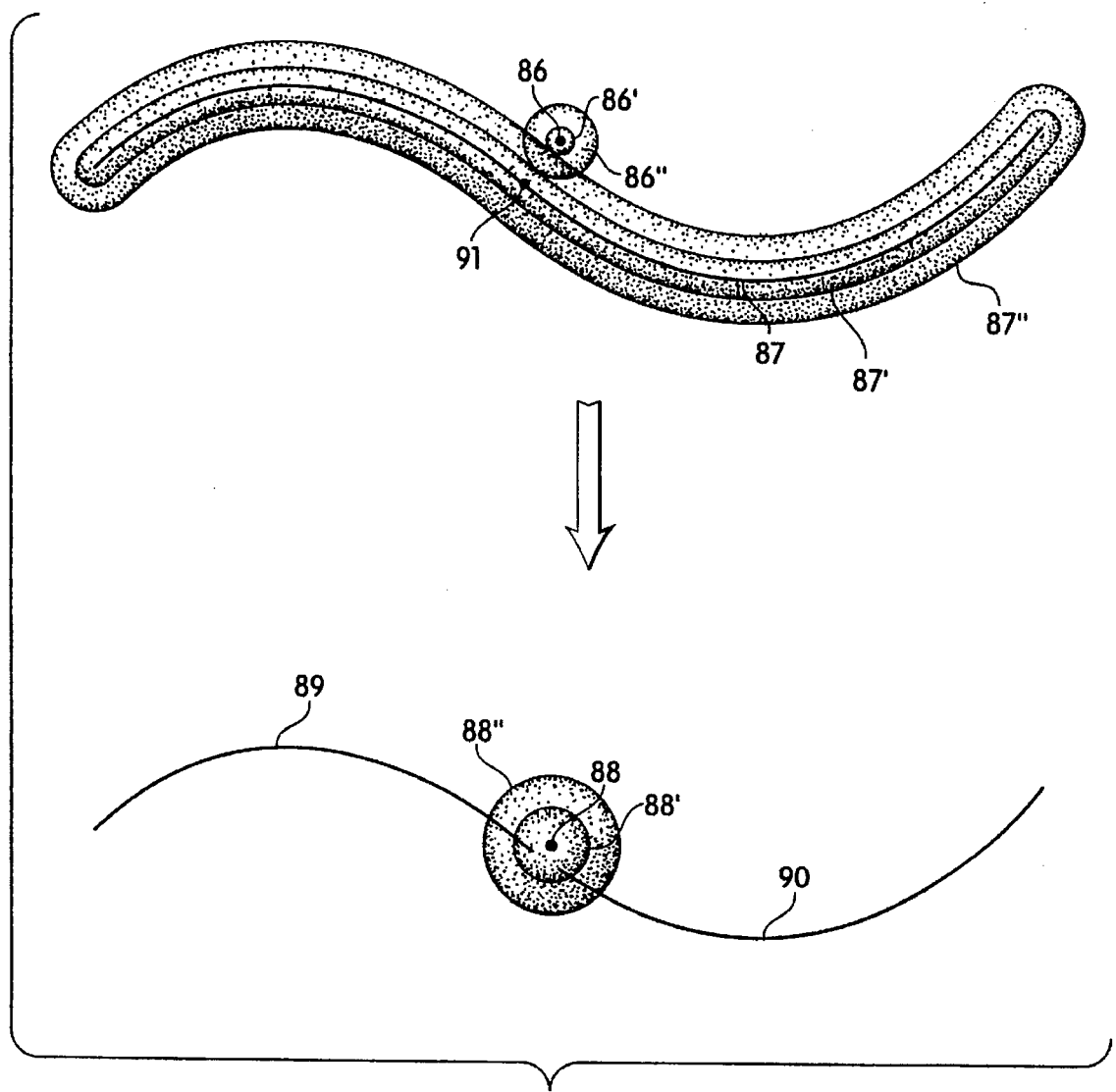

FIG. 8 illustrates the intersection of a vertex and an edge. In particular, vertex 86 and edge 87 are within their combined Maxtol volumes 86" and 87", respectively. Accordingly, they are joined by replacing vertex 86 with new vertex 88 which is positioned at the geometric average of vertex 86 and point 91 on edge 87 which was the closest point on edge 87 to vertex 86. The edge 87 is split into new edges 89 and 90. The new edges 89 and 90 are assigned the same Mintols and Maxtols as the parent edge 87. New vertex 88 is assigned a Mintol which encloses Mintol 86" of parent vertex 86 and all space within Mintol distance 87' of point 91 on edge 87. Maxtol 88" of vertex 88 is a distance which at least encloses all of the volume defined by Maxtol 86" of parent vertex 86 and all volume within Maxtol distance 87" of point 91, As noted above however, in the preferred embodiment Maxtol must be at least two times Mintol. Accordingly, Maxtol may need to be a larger volume than described above in order to meet the limitation of being at least two times Mintol.

FIG. 9 illustrates two edges which are coincident over a finite portion of each of their lengths. In particular, edges 92 and 93 are within their combined Maxtol volumes over a portion of each of their lengths. Accordingly, the adjacent portions are deleted and replaced with new edge 96 which is the geometric average of the adjacent portions of edges 92 and 93. The Mintol 96' of new edge 96 encloses the Mintol volumes 92' and 93' of the adjacent portions of the parent edges 91 and 93. The Maxtol 96" of new edge 96 encloses the Maxtol 92" and 93" of the intersecting portions of the parent edges 92 and 93.

Edge 92 is replaced with edge 94 which comprises the portion of 92 which was not within the combined Maxtol volumes of edges 92 and 93. Edge 93 is replaced with edge 95 which comprises the portion of edge 93 which was not within the combined Maxtol volumes of edges 92 and 93. Edge 94 is assigned the same Mintol and Maxtol as parent edge 92. Edge 95 is assigned the same Mintol and Maxtol values as edge 93.

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A computer-implemented method for creating a geometric model of a three dimensional object in which said object is represented by a plurality of topological entities in a linked network, wherein each topological entity corresponds to a geometric entity in the three dimensional object, said method comprising the steps of:

assigning a Mintol value to each topological entity designating a first distance from said topological entity that defines a Mintol volume surrounding said topological entity substantially representing an accumulated error associated with the corresponding topological entity, each topological entity having at least one portion, each portion of each topological entity having a portion Mintol value equal to the Mintol value of the topological entity and a portion Mintol volume surrounding the portion;

assigning a Maxtol value to each topological entity designating a second distance from said topological entity that defines a Maxtol volume surrounding said topological entity substantially representing an operational tolerance associated with the corresponding topological entity, each portion of each topological entity having a portion Maxtol value equal to the Maxtol value of the topological entity, and a portion Maxtol volume surrounding the portion, the Maxtol value being greater than the Mintol value;

defining a distance D equal to a sum of a first Maxtol value of a first topological entity and a second Maxtol value of a second topological entity;

when a first portion of the first topological entity and a second portion of the second topological entity are within the distance D from one another:

joining the first portion and the second portion to create a new topological entity, assigning to the new topological entity a new Maxtol value defining a new Maxtol volume surrounding the new topological entity enclosing a first portion Maxtol volume surrounding the first portion and a second portion Maxtol volume surrounding the second portion, and assigning to the new topological entity a new Mintol value defining a new Mintol volume surrounding the new topological entity enclosing a first portion Mintol volume surrounding the first portion and a second portion Mintol volume surrounding the second portion.

2. A method as set forth in claim 1 further including the step of reassigning a Maxtol value of at least twice the Mintol value of the corresponding topological entity, if the Maxtol value is not already at least twice the Mintol value of the corresponding topological entity.

3. A method as set forth in claim 2 wherein said topological entities are one of a vertex, an edge and a face.

4. A method as set forth in claim 3, further comprising the steps of:

creating a non-joined topological entity without joining two other topological entities; and assigning a Mintol value to the non-joined topological entity which represents an accuracy of the representation of the non-joined topological entity in the geometric model.

5. A special purpose computer directed by a software program for creating a geometric model of a three dimensional object in which said object is represented by a plurality of topological entities in a linked network, wherein each topological entity corresponds to a geometric entity in the three dimensional object, comprising:

means for creating a database of topological entities in a linked network, which network defines the model, means for assigning a Mintol value to each topological entity designating a first distance from said topological entity that defines a Mintol volume surrounding said topological entity substantially representing an accumulated error associated with the corresponding topological entity, each topological entity having at least one portion, each portion of each topological entity having a portion Mintol value equal to the Mintol value of the topological entity and a portion Mintol volume surrounding the portion;

means for assigning a Maxtol value to each topological entity designating a second distance from said topological entity that defines a Maxtol volume surrounding said topological entity substantially representing an operational tolerance associated with the corresponding topological entity, each portion of each topological entity having a portion Maxtol value equal to the Maxtol value of the topological entity and a portion Maxtol volume surrounding the portion, the Maxtol value being greater than the Mintol value;

means for defining a distance D equal to a sum of a first Maxtol value of a first topological entity and a second Maxtol value of a second topological entity;

means for joining a first portion of the first topological entity and a second portion of a second topological entity to create a new topological entity when the first portion and the second portion are within the distance D from one another;

means for assigning to the new topological entity a new Maxtol value defining a new Maxtol volume surrounding the new topological entity enclosing a first portion Maxtol volume surrounding the first portion and a second portion Maxtol volume surrounding the second portion, and means for assigning to the new topological entity a new Mintol value defining a new Mintol volume surrounding the new topological entity enclosing a first portion Mintol volume surrounding the first portion and a second portion Mintol volume surrounding the second portion.

6. An apparatus as set forth in claim 5 further comprising means for reassigning a Maxtol value of at least twice the Mintol value of the corresponding topological entity, if the Maxtol value is not already at least twice the Mintol value of the corresponding topological entity.

7. An apparatus as set forth in claim 6 wherein said topological entities are any of vertices, edges and faces.

8. An apparatus as set forth in claim 7 wherein a topological entity which is created other than by the joining of two other entities is assigned a Mintol value which represents the accuracy of the representation of the entity in the model.

9. A computer-implemented method of modeling a three dimensional object, comprising the steps of:

representing the object with a plurality of topological entities in a linked network, each topological entity including a first positional uncertainty value and a second positional uncertainty value;

joining a first topological entity and a second topological entity to form a new topological entity when a distance between the first topological entity and the second topological entity is within an intersecting distance defined by at least one of the second positional uncertainty value assigned to the first topological entity and the second positional uncertainty value assigned to the second topological entity;

for each one of the first and second topological entities, defining a first adjacent value equal to a sum of the first positional uncertainty value of the one of the first and second topological entities and a distance from the one of the first and second topological entities to the new topological entity; and assigning to the new topological entity a first positional uncertainty value equal to at least a largest of the first adjacent values for the first and second topological entities.

10. The computer-implemented method of modeling a three dimensional object as recited in claim 9, further comprising the steps of:

for each one of the first and second topological entities, defining a second adjacent value equal to a sum of the second positional uncertainty value of the one of the first and second topological entities and the distance from the one of the first and second topological entities to the new topological entity; and assigning to the new topological entity a second positional uncertainty value equal to at least a largest of the second adjacent values for the first and second topological entities, wherein the second positional uncertainty value defines a distance within which another topological entity will be defined as intersecting with the new topological entity.

11. The computer-implemented method as recited in claim 10, further comprising the steps of:
   determining when the second positional uncertainty value of the new topological entity exceeds a predetermined maximum second positional uncertainty value; and
   alerting a user when the maximum second positional uncertainty value has been exceeded.

12. The computer-implemented method as recited in claim 10, wherein the step of assigning the second positional uncertainty value to the new topological entity includes setting the second positional uncertainty value equal to at least twice the first positional uncertainty value of the new topological entity.

13. The computer-implemented method as recited in claim 12, further comprising the steps of:
   determining when the second positional uncertainty value of the new topological entity exceeds a predetermined maximum second positional uncertainty value; and
   alerting a user when the maximum second positional uncertainty value has been exceeded.

14. A computer-implemented method for modeling a three dimensional object and for assigning a plurality of first tolerance values to a corresponding plurality of topological entities in a model of the three dimensional object, the object being represented by the model in a first system in which the object is represented by the plurality of topological entities in a linked network, the method comprising the steps of:
   importing the model into a second system; and
   in the second system:
      examining each topological entity of the plurality of topological entities in the linked network;
      calculating the corresponding first tolerance value for each topological entity of the plurality of topological entities;
      assigning the calculated first tolerance value to each topological entity; and
      joining a first topological entity and a second topological entity of the plurality of topological entities when a distance between the first and second topological entities is within an intersecting distance defined by at least one of the first tolerance value assigned to the first topological entity and the first tolerance value assigned to the second topological entity.

15. The computer-implemented method as recited in claim 14, wherein the calculating step includes setting, for each of the plurality of topological entities, a second tolerance value, equal to twice the first tolerance value of the topological entity.

16. The computer-implemented method as recited in claim 14, wherein the calculating step includes the steps of:
   for a particular topological entity representing a joining of at least two other topological entities:
      for each other topological entity joined by the particular topological entity, determining a first adjacent value equal to a sum of a distance from the particular topological entity to the other topological entity and the first tolerance value of the other topological entity; and
      setting the first tolerance value of the particular topological entity equal to at least a largest of the first adjacent values.

17. The computer-implemented method as recited in claim 16, wherein the calculating step further includes setting a second tolerance value of the particular topological entity equal to at least twice the first tolerance value of the particular topological entity.

18. The computer-implemented method as recited in claim 16, wherein the calculating step further includes the steps of:
   for each other topological entity joined by the particular topological entity, determining a second adjacent value equal to a sum of the distance from the particular topological entity to the other topological entity and a second tolerance value of the other topological entity; and
   setting the second tolerance value of the particular topological entity equal to at least a largest of the second adjacent values.

19. The computer-implemented method as recited in claim 14 wherein the method further comprises the steps of:
   for a particular topological entity representing a joining of at least two other topological entities:
      assigning position coordinates to each topological entity; and creating a list of the topological entities joined by the particular topological entity.

20. The computer-implemented method as recited in claim 19, further comprising the steps of:
   for each topological entity in the list, defining a first adjacent value equal to a sum of the first tolerance value of the topological entity and a distance to the particular topological entity; and
   assigning to the particular topological entity a first tolerance value equal to at least a largest of the first adjacent values for the topological entities in the list.

21. The computer-implemented method as recited in claim 20, further comprising the steps of:
   for each topological entity in the list, defining a second adjacent value equal to a sum of a second tolerance value of the topological entity and the distance to the particular topological entity; and
   assigning to the particular topological entity a second tolerance value equal to at least a largest of the second adjacent values wherein the second tolerance value defines a distance within which another topological entity will be defined as intersecting.

22. The computer-implemented method as recited in claim 21, further comprising the steps of:
   determining when the second tolerance value of the particular topological entity exceeds a predetermined maximum second tolerance value; and notifying a user when the maximum second tolerance value has been exceeded.

23. A computer-implemented method for creating a geometric model of a three dimensional object, comprising the steps of:
   representing the object with a plurality of topological entities in a linked network, wherein each topological entity corresponds to a geometric entity in the three-dimensional object;
   assigning a first positional uncertainty value to each topological entity;
   assigning a second positional uncertainty value to each topological entity, wherein the second positional uncertainty value defines an intersecting distance within which another topological entity will be defined as intersecting; and
   joining a first topological entity and a second topological entity of the plurality of topological entities when a distance between the first and second topological entities is within the intersecting distance of at least one of the first topological entity and the second topological entity.

24. The computer-implemented method as recited in claim 23, further comprising the steps of:

for at least one particular topological entity, assigning location coordinates and a list of at least two other topological entities adjacent to the at least one particular topological entity;

for each topological entity in the list, defining a first adjacent value equal to a sum of the first positional uncertainty value of the topological entity and a distance to the particular topological entity; and assigning to the at least one particular topological entity a first positional uncertainty value equal to at least a largest of the first adjacent values for the topological entities in the list.

25. The computer-implemented method of modeling a three dimensional object as recited in claim 24, further comprising the steps of:

for each topological entity in the list, defining a second adjacent value equal to a sum of the second positional uncertainty value of the topological entity and the distance to the at least one particular topological entity; and assigning to the at least one particular topological entity a second positional uncertainty value equal to at least a largest of the second adjacent values for the topological entities in the list.

26. The computer-implemented method as recited in claim 25, further comprising the steps of:

determining when the second positional uncertainty value of the at least one particular topological entity exceeds a predetermined maximum second positional uncertainty value; and alerting a user when the maximum second positional uncertainty value has been exceeded.

27. The computer-implemented method as recited in claim 25, wherein the step of assigning the second positional uncertainty value to the at least one particular topological entity includes setting the second positional uncertainty value equal to at least twice the first positional uncertainty value of the particular topological entity.

28. The computer-implemented method as recited in claim 27, further comprising the steps of:

determining when the second positional uncertainty value of the at least one particular topological entity exceeds a predetermined maximum second positional uncertainty value; and alerting a user when the maximum second positional uncertainty value has been exceeded.

29. A computer-implemented method for creating a geometric model of a three dimensional object in which the object is represented by a plurality of topological entities in a linked network, wherein each topological entity corresponds to a geometric entity in the three dimensional object, the method comprising the steps of:

defining a first portion of a first topological entity and a second portion of a second topological entity as intersecting when within a predetermined distance from one another;

joining the first portion of the first topological entity and the second portion of the second topological entity when the first and second portions have been defined as intersecting; and maintaining at least a first value representing an actual distance between the first and second portions considered to intersect.

30. The method as recited in claim 29, wherein the step of joining includes the step off joining the first portion and the second portion to create a new topological entity.

31. The method as recited in claim 30, further comprising the steps of:

determining a first adjacent value equal to a sum of a distance from the new topological entity to the first portion and a positional tolerance of the first portion;

determining a second adjacent value equal to a sum of a distance from the new topological entity to the second portion and a positional tolerance of the second portion; and assigning a second value to the new topological entity equal to at least a greater of the first and second adjacent values.

32. The method as recited in claim 31, further comprising the steps of:

assigning a third value to the new topological entity equal to at least twice the assigned second value.

33. The computer-implemented method as recited in claim 30, wherein the step of defining further includes the steps of:

assigning position coordinates to the new topological entity; and creating a list of topological entities joined by the new topological entity.

34. The computer-implemented method as recited in claim 33, further comprising the steps of:

for each topological entity in the list, defining a first adjacent value equal to a sum of a distance to the new topological entity and a first positional uncertainty value; and assigning to the new topological entity a first positional uncertainty value equal to at least a largest of the first adjacent values for the topological entities in the list.

35. The computer-implemented method as recited in claim 34, further comprising the steps of:

for each topological entity in the list, defining a first adjacent value equal to a sum of the distance to the new topological entity and a second positional uncertainty value; and assigning to the new topological entity a second positional uncertainty value equal to a largest of the second adjacent values for the topological entities in the list wherein the second positional uncertainty value defines a distance within which another topological entity will be defined as intersecting.

36. The computer-implemented method as recited in claim 35, further comprising the steps of:

determining when the second positional uncertainty value of the new topological entity exceeds a predetermined maximum second positional uncertainty value; and alerting a user when the maximum second positional uncertainty value has been exceeded.

* * * * *